US008355026B2

(12) United States Patent
Kimoto et al.

(10) Patent No.: US 8,355,026 B2
(45) Date of Patent: Jan. 15, 2013

(54) SYSTEM, METHOD, AND PROGRAM FOR DISPLAYING MULTIPLE WINDOWS HAVING DIFFERENT RESOLUTIONS

(75) Inventors: Hiroyuki Kimoto, Isehara (JP); Takamasa Koike, Kawasaki (JP); Nobutaka Honma, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 2371 days.

(21) Appl. No.: 11/136,648

(22) Filed: May 24, 2005

(65) Prior Publication Data

US 2005/0264589 A1 Dec. 1, 2005

(30) Foreign Application Priority Data

May 31, 2004 (JP) ................................ 2004-160810

(51) Int. Cl.
*G06T 1/00* (2006.01)
*G06T 17/00* (2006.01)
*G06F 15/00* (2006.01)
*G09G 5/00* (2006.01)

(52) U.S. Cl. ......... 345/501; 345/428; 345/581; 345/629

(58) Field of Classification Search .................. 345/501, 345/419, 428, 581, 629, 660, 698–699, 3.3; 348/564, 569; 709/204
See application file for complete search history.

(56) References Cited

U.S. PATENT DOCUMENTS

| | | | | |
|---|---|---|---|---|
| 6,452,641 | B1 * | 9/2002 | Chauvel et al. | 348/569 |
| 6,650,323 | B2 * | 11/2003 | Naegle et al. | 345/419 |
| 2005/0010638 | A1 * | 1/2005 | Richardson et al. | 709/204 |

FOREIGN PATENT DOCUMENTS

| | | |
|---|---|---|
| JP | 07-281880 | 10/1995 |
| JP | 08-069368 | 3/1996 |
| JP | 11-053116 | 2/1999 |
| JP | 2001-159967 | 6/2001 |
| JP | 2002-268796 | 9/2002 |
| JP | 2001-159967 | 6/2006 |

* cited by examiner

*Primary Examiner* — Tize Ma

(57) ABSTRACT

To allow a resolution to be changed by a single drawing command for each window instead of using different drawing commands in an application program depending on resolutions, in order to display a plurality of windows having different resolutions on a single display screen by use of a drawing facility for drawing a window specified by a drawing command from an application program with a resolution selected from a plurality of resolutions, first, windows to be drawn are registered in a list. The list is accessed in response to a drawing command from an application program to determine the resolution of a window to be drawn. The drawing facility is instructed to draw the window with the determined resolution. The image of the window drawn by the drawing facility is written into a frame buffer. The image is read from the frame buffer and displayed on a screen.

3 Claims, 5 Drawing Sheets

SYSTEM, METHOD, AND PROGRAM FOR DISPLAYING MULTIPLE WINDOWS HAVING DIFFERENT RESOLUTIONS

FIELD OF THE INVENTION

The present invention relates to multi-window displays, and more particularly to a system, method, and program for displaying a plurality of windows having different resolutions on a high resolution single display screen.

BACKGROUND

As the resolution of computer displays such as LCDs has become higher, display quality has improved. As a result, a user is able to recognize more information content at a glance because of the increased amount of information displayed. Nevertheless, a problem of lowered visibility has arisen because the size of icons and characters has been reduced. This problem could be resolved by temporarily changing the display resolution. However, it is preferable to display various kinds of information simultaneously using multiple resolutions on the same display.

An example of simultaneous display with multiple resolutions is disclosed in U.S. patent application Ser. No. 10/427,386 filed on Apr. 30, 2003, and assigned to the present assignee. In this example, a high resolution three-dimensional graphics window and a low resolution two-dimensional graphics window can be displayed simultaneously on a single high resolution display by employing a frame buffer including a first mode area for high resolution and a second mode area for low resolution. The contents of the first mode area of the frame buffer are directly displayed on the display screen, while the contents of the second mode area are displayed after expanding the width and the height each by a factor of two. Accordingly, it is possible to display the contents of the second mode area, for example a low resolution two-dimensional graphics window including icons and characters, on the display screen without lowering its visibility while displaying the contents of the first mode area, for example a high resolution three-dimensional graphics window, on the same display screen.

More specifically, in the case of single-resolution display, when high resolution display is performed using, for example, a CAD application, a design drawing of an automobile might be displayed in detail, whereas the visibility of icons and characters in a tool bar might be greatly reduced. If the multiple resolution display method described above were applied to this case, a tool bar could be displayed with larger size thereby to improve its visibility while a high resolution design drawing is displayed.

The multiple resolution simultaneous display function described above can be provided in the form of, for example, a display driver. An example of the conventional drawing methods using such a display driver is shown in FIG. 1.

Referring to FIG. 1, first an application program 30 determines whether a target to be drawn is a high resolution window. If the target is a high resolution window, a high resolution drawing command (glDrawPixels of OpenGL, for example) is sent to a display driver 32. If the target is not a high resolution window, then a low resolution drawing command (BitBlt of Microsoft® Windows®, for example) is sent to the display driver 32. When the display driver 32 receives the high resolution drawing command, it executes a drawing operation as specified by the command, and writes its results into a frame buffer (VRAM) 34. On the other hand, when the display driver 32 receives the low resolution drawing command, it enlarges an object to be drawn by doubling its width and height, and writes the results into the frame buffer 34. Finally, when the contents of the frame buffer 34 are read out to a display 36, the first window having a high resolution and the second window having a low resolution are displayed simultaneously on the same display 36 without reducing the visibility of icons and characters of the second window.

In conventional drawing methods such as the one described above, however, the distinction between the high and low resolution drawings is made based on the difference between two drawing commands (API), for example, OpenGL and Windows GDI. Therefore, application developers have to be familiar with both commands.

SUMMARY

Accordingly, an object of the present invention is to provide a system, method, and program which allow resolution to be changed by a single drawing command for each window, instead of using different drawing commands in an application program depending on resolutions.

According to a first aspect of the present invention, there is provided a system for displaying a plurality of windows having different resolutions on a single display screen using a drawing facility for drawing a window specified by a drawing command from an application program with a resolution selected from a plurality of resolutions, which includes registration means for registering windows to be displayed in a list and drawing control means for determining a resolution of a window to be drawn by accessing the list in response to the drawing command from the application program, and instructing the drawing facility to draw the window with the determined resolution.

According to a second aspect of the present invention, there is provided a system for displaying a plurality of windows having different resolutions on a single display screen, which includes registration means for registering windows to be displayed in a list, drawing means for drawing a window specified by a drawing command from an application program with a resolution selected from a plurality of resolutions, drawing control means for determining a resolution of a window to be drawn by accessing the list in response to the drawing command from the application program, and instructing the drawing means to draw the window with the determined resolution, and buffering means for storing an image of the window drawn by the drawing means, wherein the contents stored in the buffering means are displayed on the display screen.

According to a third aspect of the present invention, there is provided a method for displaying a plurality of windows having different resolutions on a single display screen using a drawing facility for drawing a window specified by a drawing command from an application program with a resolution selected from a plurality of resolutions, which includes the steps of registering windows to be displayed in a list, and determining a resolution of a window to be drawn by accessing the list in response to the drawing command from the application program, and instructing the drawing facility to draw the window with the determined resolution.

According to a fourth aspect of the present invention, there is provided a method for displaying a plurality of windows having different resolutions on a single display screen, which includes the steps of registering windows to be displayed in a list, determining a resolution of a window to be drawn by accessing the list in response to a drawing command from an application program, and instructing to draw the window with the determined resolution, drawing the window with the determined resolution, storing a drawn image of the window in a buffer, and displaying the contents stored in the buffer on the display screen.

According to a fifth aspect of the present invention, there is provided a program for displaying a plurality of windows having different resolutions on a single display screen using a drawing facility for drawing a window specified by a drawing command from an application program with a resolution selected from a plurality of resolutions, which causes a computer to execute the procedures of registering windows to be displayed in a list, and determining a resolution of a window to be drawn by accessing the list in response to the drawing command from the application program, and instructing the drawing facility to draw the window with the determined resolution.

According to a sixth aspect of the present invention, there is provided a program for displaying a plurality of windows having different resolutions on a single display screen, which causes a computer to execute the procedures of registering windows to be displayed in a list, determining a resolution of a window to be drawn by accessing the list in response to the drawing command from the application program, and instructing to draw the window with the determined resolution, drawing the window with the determined resolution, storing a drawn image of the window in a buffer, and displaying the contents stored in the buffer on the display screen.

In each aspect described above, the list may contain only information (ID) of each window having a first resolution, or alternatively may contain IDs and resolutions of all windows to be displayed. In any case, by accessing the list in response to a drawing command from an application program, the resolution of the window specified by the drawing command can be determined. With the present invention, accordingly, a plurality of resolutions can be accommodated by use of a single drawing command.

DETAILED DESCRIPTION

Preferred embodiments of the present invention will next be described with reference to the accompanying drawings. First, an embodiment in which windows are drawn and displayed with two kinds of resolutions, that is, a high resolution (e.g., 200 dpi) and a low resolution (e.g., 100 dpi), will be described. Subsequently, another embodiment which uses three or more kinds of resolutions will be described.

Figure 1:
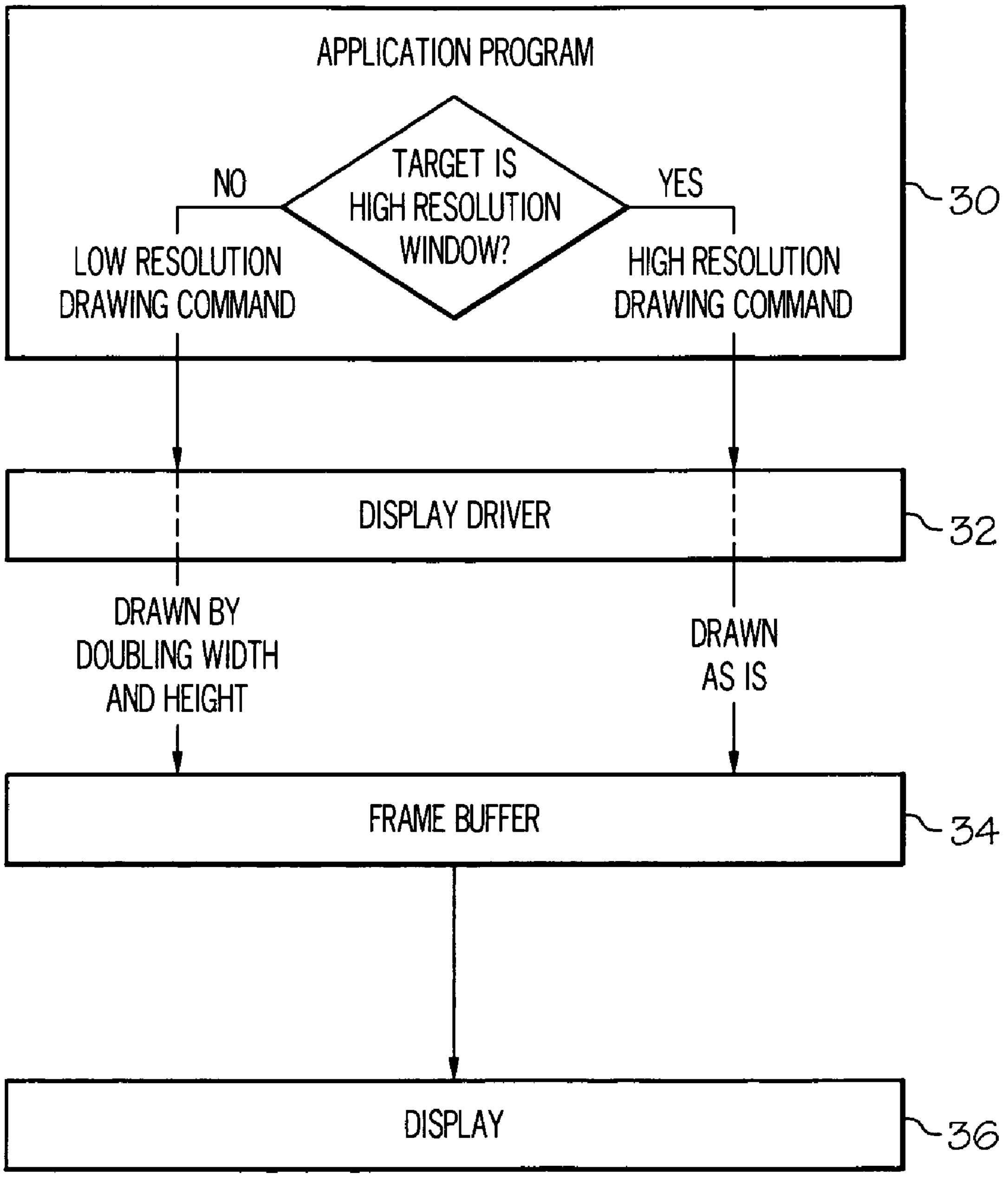
FIG. 1 (PRIOR ART)
FIG. 1 is a diagram showing an exemplary configuration of a conventional high resolution/low resolution display system.
Figure 2:
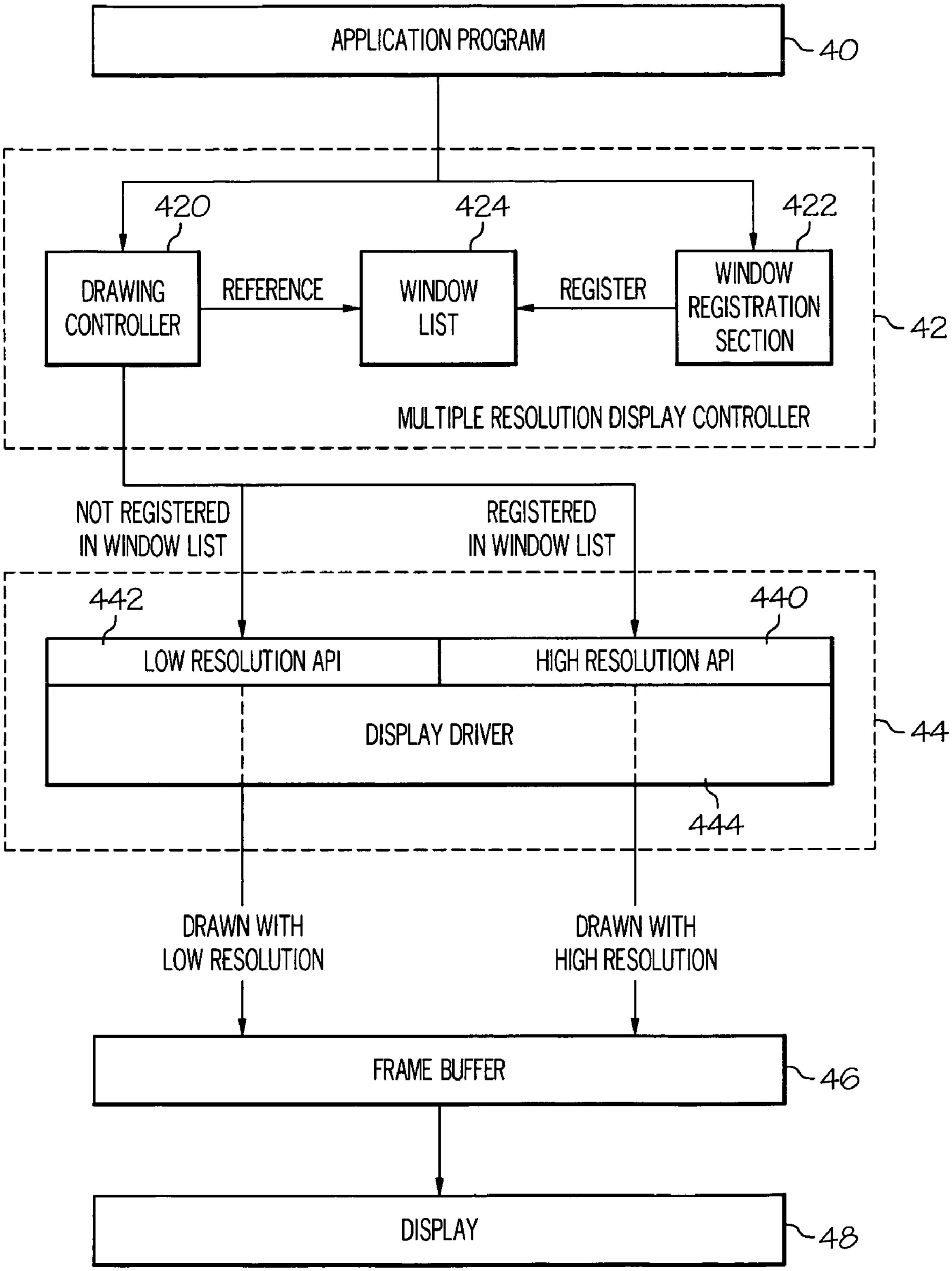
FIG. 2 is a diagram showing a display system according to a first embodiment of the present invention.

FIG. 2 shows a schematic diagram of a system which displays a high resolution window and a low resolution window simultaneously on a display screen in response to a single kind of drawing command from an application program. In the embodiment described below, a drawing command from an application program 40*a* invokes a drawing function (e.g., BitBlt) provided by an operating system such as Windows XP. However, a different drawing command may also be used.

A display system shown in FIG. 2 includes a multiple resolution display controller 42 for controlling window displaying with high and low resolutions in response to a drawing command from the application program 40, a drawing engine 44 for drawing a window specified by the application program 40 with the high or low resolution in accordance with the processing result of the multiple resolution display controller 42, a frame buffer 46 for storing a bitmap image of the window drawn by the drawing engine 44, and a display 48 for displaying the contents stored in the frame buffer 46. The display system of this type can be implemented in a general computer system such as a personal computer, a work station, or the like.

The multiple resolution display controller 42 includes a drawing controller 420 for processing the drawing command from the application program 40 to cause the drawing engine 44 to perform a drawing operation with the high or low resolution, a window registration section 422 for registering only windows to be displayed with a first resolution (which is assumed to be a high resolution in this embodiment, but may be a low resolution) in a list prior to the drawing operation, and a window list 424 for retaining IDs of high resolution windows registered by the window registration section 422. The drawing engine 44 includes a high resolution API 440 for drawing a window specified by the drawing command from the application program 40 with the high resolution, a low resolution API 442 for drawing a specified window with the low resolution; and a display driver 444 for performing the drawing operation by the high resolution API 440 or low resolution API 442. In the present embodiment, the OpenGL function is employed as the high resolution API 440, and the BitBlt function of Win32GDI is employed as the low resolution API 442. However, different APIs may also be used. The display driver 444 may be the same as the one described in the U.S. Patent Application described above.

Figure 3:
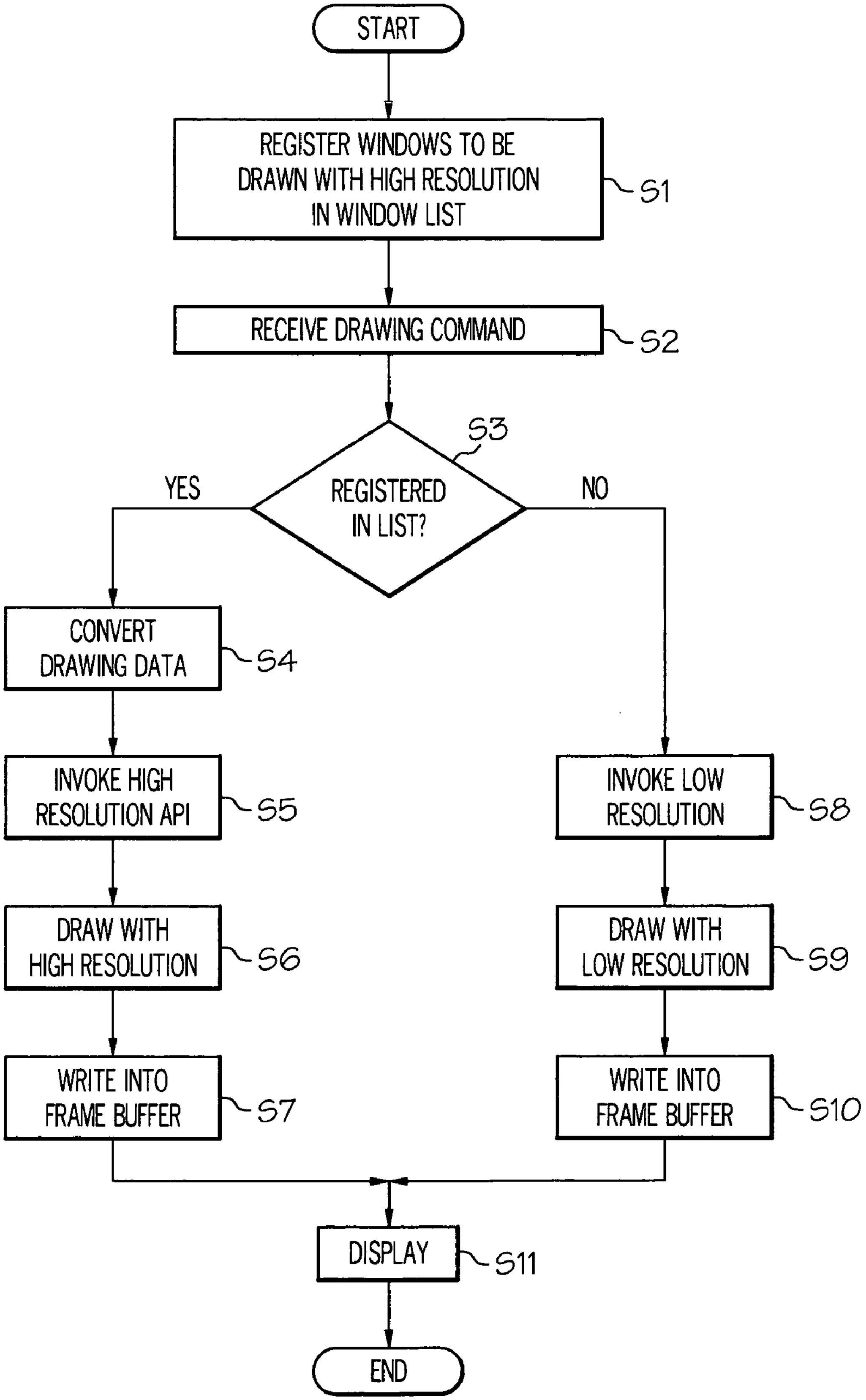
FIG. 3 is a flowchart showing the operation of the display system shown in FIG. 2.

Next, the operation of the display system shown in FIG. 2 will be described with reference to the flowchart in FIG. 3. The operation of the display system starts when the application program 40 launches. In the first step S1, windows to be drawn with the high resolution are registered in the window list 424. This is achieved by notifying an ID of each window to be drawn with the high resolution from the application program 40 to the window registration section 422. The window registration section 422 registers the window IDs received from the application program 40 in the list 424 which is application specific. In the following step S2, the drawing controller 420 receives a drawing command including an ID of a window to be drawn from the application program 40. As described above, this drawing command invokes, for example, the BitBlt function described above. In the present embodiment, this BitBlt function is included in the drawing engine 44 as the low resolution API 442. Originally, the low resolution API 442 was accessed through invocation from the application program 40, which permitted only low resolution drawing and displaying. According to the present invention, however, windows can be drawn and displayed with multiple resolutions by processing the invocation (drawing command) in the drawing controller 420.

The drawing controller 420 references the list 424 with the window ID specified by the drawing command to determine whether the window ID has been registered in the list 424 (Step S3) and, if registered, performs conversion processing to draw the window with the high resolution (Step S4). As described above, in the present embodiment, the drawing command from the application program 40 invokes the BitBlt function which is a low resolution API. Consequently, in order to draw the window with the high resolution, drawing data (bitmap and raster operation code) for the BitBlt function must be converted into data for the high resolution. This conversion is performed in Step S4. When OpenGL is employed to draw high resolution windows, a coordinate conversion is performed for the bitmap while a code conversion from the BitBlt function to OpenGL is performed for the raster operation code. In the coordinate conversion, a bitmap for BitBlt (with the origin located at the upper left corner) is converted into a bitmap for OpenGL (with the origin located at the lower left corner). In the raster operation code conversion, for example, SRCCOPY (copy a source bitmap to a destination), DSTINVERT (invert bits of a destination bitmap), SRCAND (compute logical product of source and destination bitmaps) and SRCPAINT (compute logical sum of source and destination bitmaps) of the BitBlt function are converted into the corresponding codes of OpenGL, that is, GL_COPY, GL_INVERT, GL_AND, and GL_OR, respectively. Similar conversions are performed for the remaining codes.

The drawing controller 420 then invokes the high resolution API 440 for drawing a window with a high resolution (Step S5). In the present embodiment, the high resolution API is OpenGL API, and thus glDrawPixels which is a bitmap drawing function of OpenGL is used. The display driver 444 draws the window with the high resolution in accordance with the invoked high resolution API 440 and the converted drawing data (Step S6), and writes the resulting data or bitmap image of the high resolution window into the frame buffer 46 (Step S7).

On the other hand, if it is determined in Step S3 that the window ID is not registered in the list 424, then the drawing controller 420 invokes the low resolution API 442 (Step S8) for drawing the window with the low resolution without performing the drawing data conversion. The display driver 444 draws the window with the low resolution in accordance with the invoked low resolution API 442 and the original drawing data (Step S9), and writes the resulting data or bitmap image of the low resolution window into the frame buffer 46 (Step S1). The drawing of the low resolution window may be performed by doubling the width and height, as described in the U.S. Patent Application described above.

Finally, the high and low resolution windows which have been written into the frame buffer 46 are displayed on the screen of the display 48 (Step S11).

Figure 4:
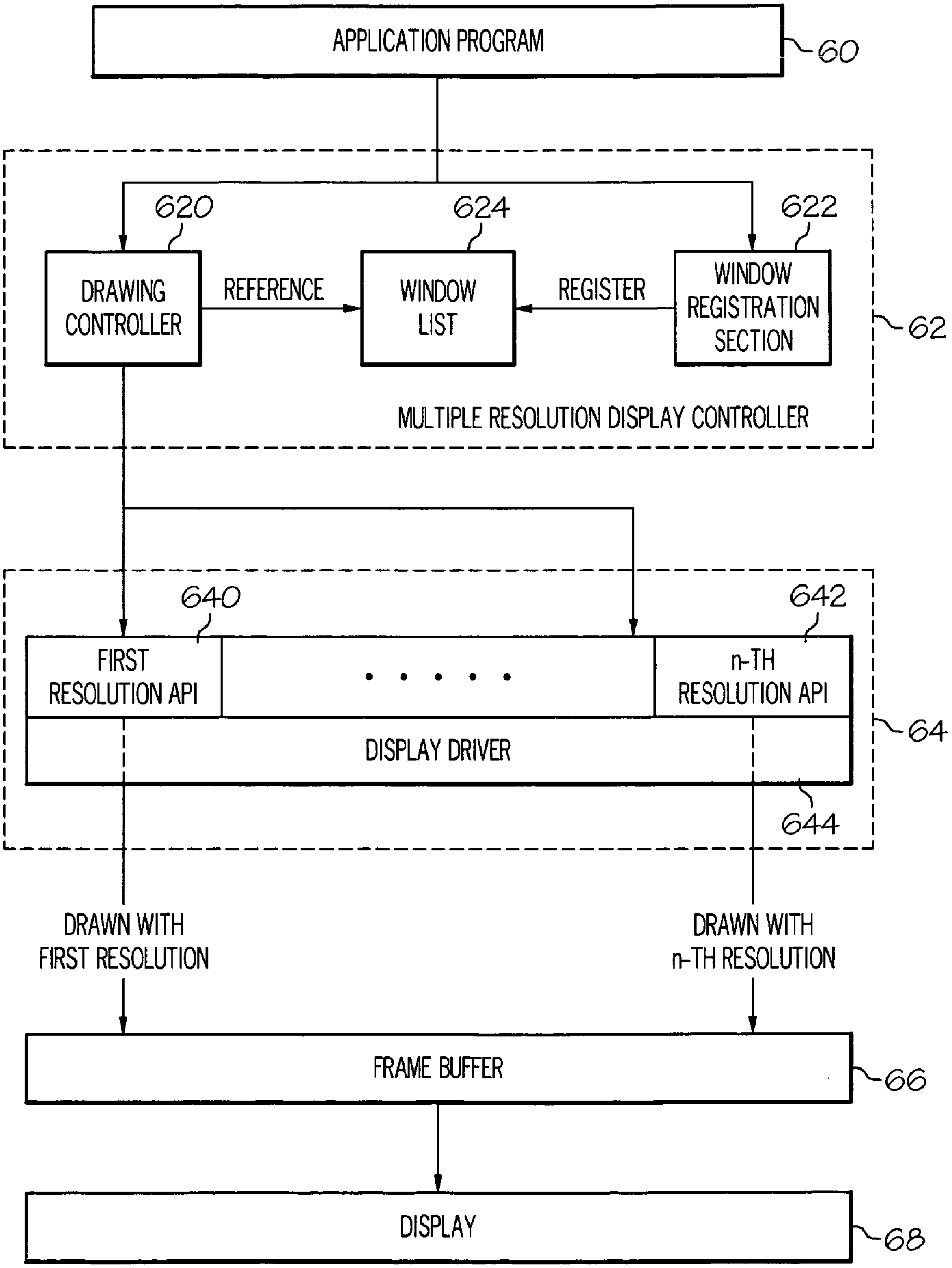
FIG. 4 is a diagram showing a display system according to a second embodiment of the present invention.

Next, another embodiment accommodating three or more resolutions will be described with reference to FIG. 4. The display system shown in FIG. 4, which is basically the same as the display system shown in FIG. 2, comprises a multiple resolution display controller 62 including a drawing controller 620, a window registration section 622 and a window list 624, a drawing engine 64 including a number n (n: an integer equal to or greater than three) of drawing APIs 640 to 642 corresponding to the respective resolutions and a display driver 644, a frame buffer 66, and a display 68. In the multiple resolution display controller 62, IDs and resolutions of all windows to be displayed are registered in the window list 624 so that three or more resolutions can be accommodated.

Figure 5:
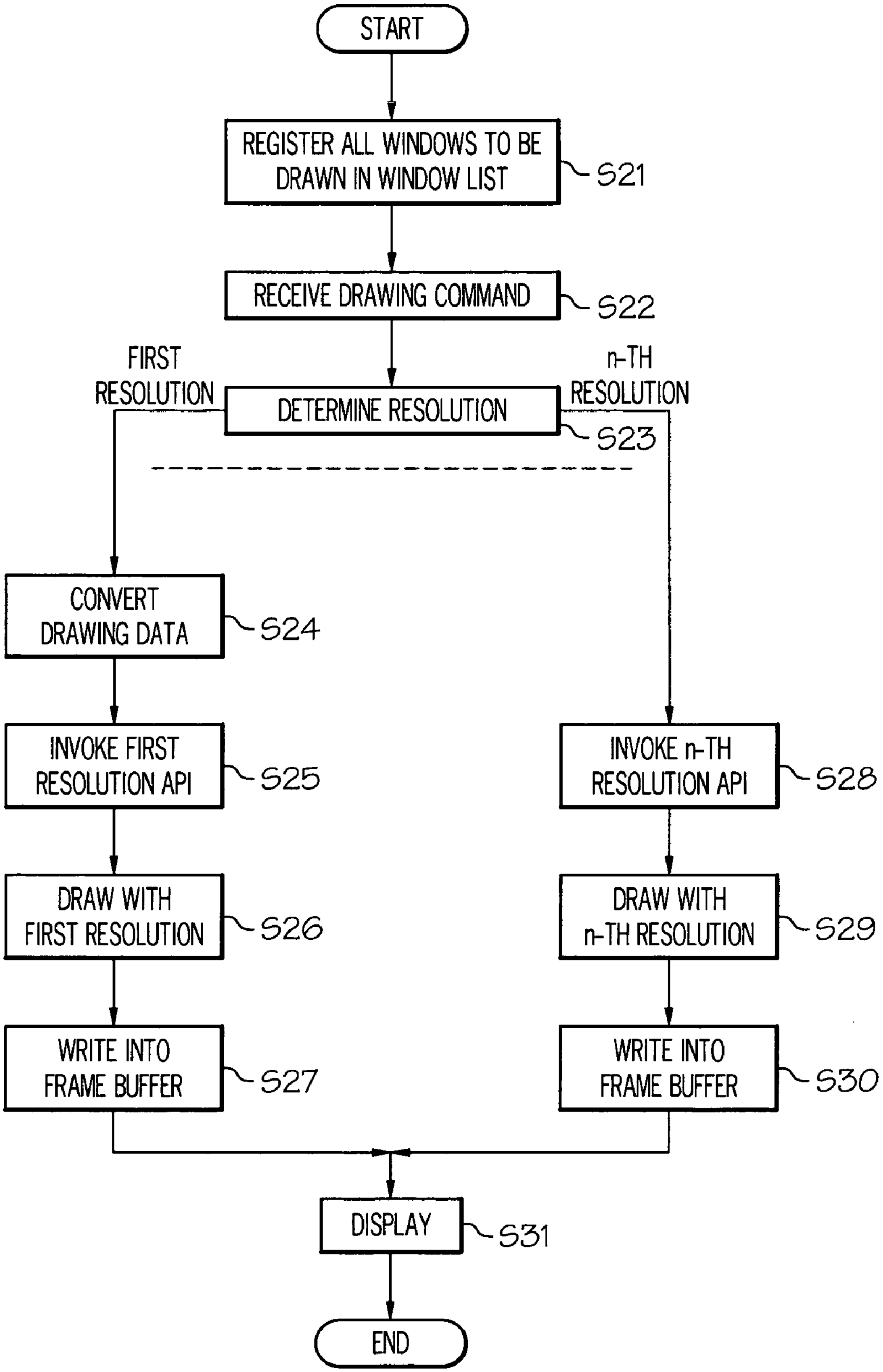
FIG. 5 is a flowchart showing the operation of the display system shown in FIG. 4.

Next, the operation of the display system shown in FIG. 4 will be described with reference to the flowchart shown in FIG. 5. The operation of the display system starts when the application program 60 launches. In the first step S21, all windows to be displayed are registered in the window list 624. This is achieved by notifying IDs and resolutions of such windows from the application program 60 to the window registration section 622. The window registration section 622 registers the window IDs and resolutions received from the application program 40 in a list 624 which is application specific. In the following step S22, the drawing controller 620 receives a drawing command including an ID of a window to be drawn from the application program 60. While this drawing command invokes the n-th resolution API 642 in the present embodiment, an API corresponding to a different resolution may be invoked instead.

The drawing controller 620 references the list 624 with the window ID specified by the drawing command to determine the resolution of the window (Step S23). If the determined resolution is different from the n-th resolution, and is, for example, the first resolution, then a conversion process for drawing the window with the first resolution is performed (Step S24). As described above, in Step S24, a coordinate conversion and a raster operation code conversion are performed as required.

The drawing controller 620 then invokes the first resolution API 640 for drawing the window with the first resolution (Step S25). The display driver 644 draws the first resolution window based on the invoked first resolution API 640 and the converted drawing data and writes the resulting data or bitmap image of the first resolution window into the frame buffer 66 (Step S27).

If the resolution determined in Step S23 is the n-th resolution, then the drawing controller 420 invokes the n-th resolution API 642 for drawing the window with the n-th resolution without performing the drawing data conversion (Step S28). The display driver 644 draws the n-th resolution window based on the invoked the n-th resolution API 642 and the original drawing data (Step S29), and writes the resulting data of bitmap image of the n-th resolution window into the frame buffer 66 (Step S30).

Finally, the first to n-th resolution windows which have been written into the frame buffer 66 are displayed on the screen of the display 68 (Step S31).

While preferred embodiments of the present invention have been described above, the present invention is not limited to such embodiments; those skilled in the art will recognize that various modifications can be made within the scope of the invention which is defined in the appended claims. For example, in the window list 424 of the display system shown in FIG. 2, the low resolution window IDs may be retained instead of the high resolution window IDs, or the IDs and resolutions of all windows may be retained like the window list 624 of the display system shown in FIG. 4. In addition, the high resolution API 440 may be invoked by the drawing command from the application program 40. When these modifications are made, the registration operation in Step S1, determination in Step S3 and converting process in Step S4 must be modified adequately according to such modifications.

We claim:

1. A system for displaying a plurality of windows having different resolutions on a single display screen using a drawing facility for drawing a window specified by a drawing command from an application program with a resolution selected from a plurality of resolutions, the system comprising:

registration means for registering windows to be displayed in a list; and drawing control means for determining a resolution of a window to be drawn by accessing the list in response to the drawing command from the application program, and instructing the drawing facility to draw the window with the determined resolution, wherein the list contains only information of each window having a first resolution among all the windows to be displayed.

2. A method for displaying a plurality of windows having different resolutions on a single display screen using a drawing facility for drawing a window specified by a drawing command from an application program with a resolution selected from a plurality of resolutions, the method comprising:

registering windows to be displayed in a list; and determining a resolution of a window to be drawn by accessing the list in response to the drawing command from the application program, and instructing the drawing facility to draw the window with the determined resolution, wherein the list contains only information of each window having a first resolution among all the windows to be displayed.

3. A computer program product for displaying a plurality of windows having different resolutions on a single display screen using a drawing facility for drawing a window specified by a drawing command from an application program with a resolution selected from a plurality of resolutions, the computer program product comprising a computer readable medium having computer readable program code embedded therein, the computer readable program code comprising:

computer readable program code configured to register windows to be displayed in a list; and computer readable program code configured to determine a resolution of a window to be drawn by accessing the list in response to the drawing command from the application program, and instructing the drawing facility to draw the window with the determined resolution, wherein the list contains only information of each window having a first resolution among all the windows to be displayed.

* * * * *